United States Patent [19]
Leonardi-Cattolica et al.

[11] Patent Number: 4,870,278
[45] Date of Patent: Sep. 26, 1989

[54] WIDE-RANGE FLUID LEVEL DETECTOR

[75] Inventors: Anthony M. Leonardi-Cattolica, Houston; Dale H. McMillan, Katy; Alexander Telfer, Houston, all of Tex.

[73] Assignee: Shell Oil Company, Houston, Tex.

[21] Appl. No.: 203,977

[22] Filed: Jun. 8, 1988

[51] Int. Cl.$^4$ .......................... G01F 23/00; G01T 3/00
[52] U.S. Cl. ............................ 250/357.1; 250/390.06; 250/391
[58] Field of Search ................ 250/357.1, 392, 390.06, 250/391

[56] References Cited

U.S. PATENT DOCUMENTS

| 4,038,548 | 7/1977 | Charlton | 250/357.1 |
| 4,216,376 | 8/1980 | Griffin et al. | 250/357.1 |
| 4,582,991 | 4/1986 | Leonardi-Cattolica et al. | 250/358.1 |
| 4,755,677 | 7/1988 | Blincow et al. | 250/357.1 |

Primary Examiner—Constantine Hannaher

[57] ABSTRACT

The range of a neutron backscatter fluid level detector is extended to provide essentially continuous level indication by interpolating neutron backscatter counts of neutrons supplied from a plurality of sources at various heights.

8 Claims, 1 Drawing Sheet

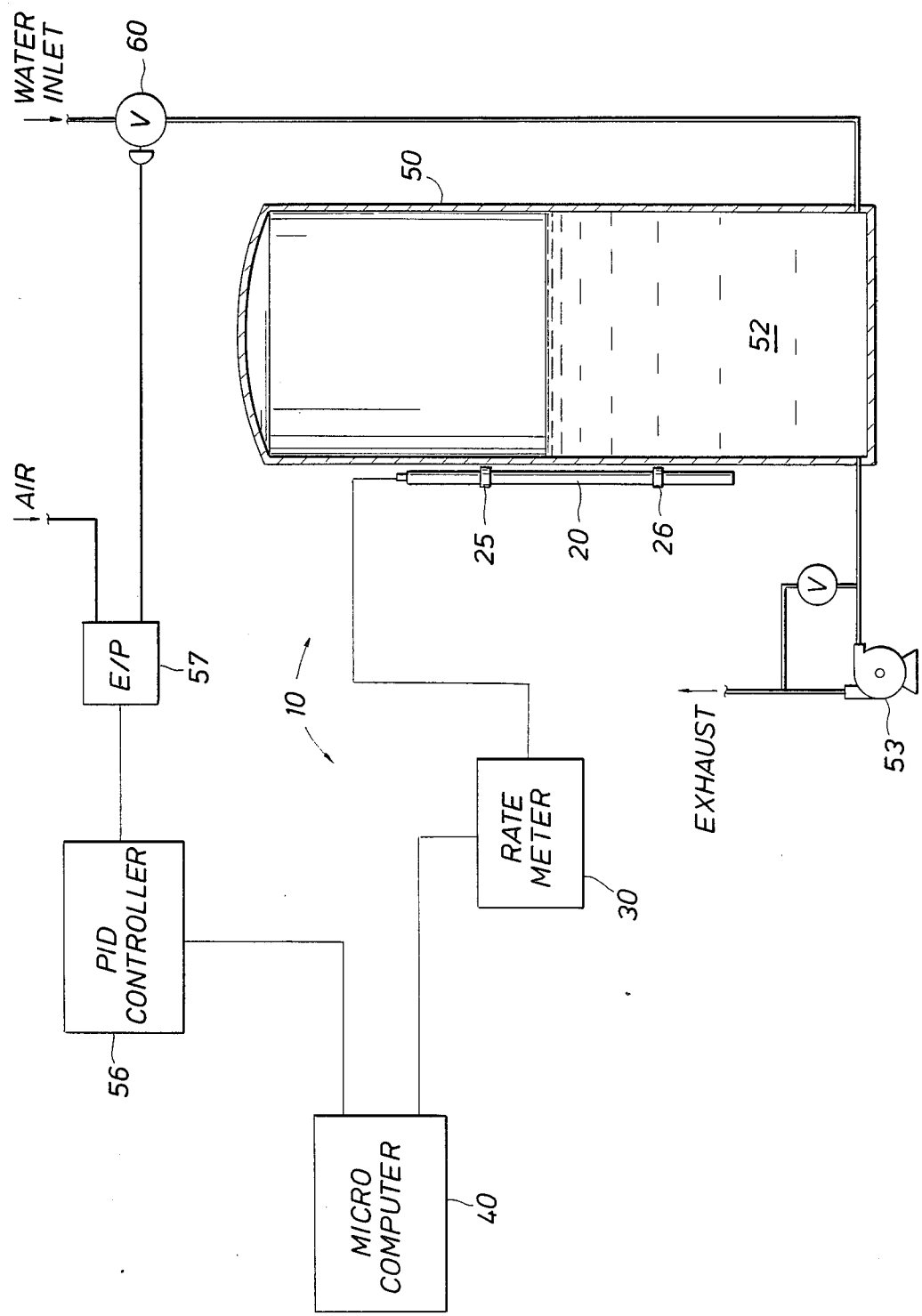

WIDE-RANGE FLUID LEVEL DETECTOR

BACKGROUND OF THE INVENTION

The present invention relates to neutron backscatter techniques for monitoring fluid levels such as water or oil levels in a vessel. These techniques are generally well known, and because they are non-intrusive, are particularly useful in certain situations where hydrogen-bearing liquid levels need to be monitored. Examples of prior art patents relating to this technology include U.S. Pat. No. 4,038,548 (Charlton, issued July 26, 1977), and U.S. Pat. No. 4,216,376 (Griffin et al, issued Aug. 5, 1980). An example of density measurement with neutron technics is shown in U.S. Pat. No. 4,582,991 (Leonardi-Cattolica et al., issued Apr. 15, 1986).

The principles involved in using neutrons to detect the presence of hydrogen are well known, for example in well logging devices and in certain types of moisture gauges. However, comparatively little attention has been paid to using these principles for solving fluid level measurement problems. In an industry like the petrochemical industry, where raw and processed materials nearly always contain substantial amounts of hydrogen, level measurement instruments employing neutrons could have wide application.

U.S. Pat. No. 4,038,548 (above) discloses a device from which portable level detectors and fixed level monitors could be made based on neutron scattering and detection principles, to indicate the presence or absence of a hydrogen bearing liquid opposite the detector. The main components of such a device (a "neutron backscatter gauge") would be a neutron emitting radioisotope, a neutron detector, and a ratemeter. Such a gauge would be a good detector for hydrogen but much less sensitive to most other materials. This would allow level measurements of hydrogen bearing materials, such as hydrocarbons, to be made through the walls of metal vessels. Measurements could be conveniently made through steel walls a few inches thick.

For detecting liquid at specific, discrete levels, neutron backscatter gauges have been used in a wide variety of level measurement applications, such as those encountered in the petrochemical industry. In a number of cases, the neutron techniques have proven to be superior to conventional level measurement methods, including gamma ray methods.

In a typical discrete level measurement application, the principal components of a neutron backscatter gauge (the neutron source, the neutron detector and the ratemeter) are arranged with the source mounted next to the neutron detector, and together they are placed near the exterior of the vessel wall. The source must emit energetic neutrons. $^{252}$Cf (californium) sources have typically been used in this work but other sources such as $^{241}$Am/Be (americium/beryllium) are also suitable. The average neutron energies for the $^{252}$Cf and $^{241}$Am/Be sources are on the order of a few million electron volts (MeV). Neutron emission rates in the range $10^4$–$10^6$ neutrons/sec are adequate for most applications. These rates are so low that the sources are easily handled in a safe manner.

$^3$He detectors are used because of their high thermal neutron detention efficiency. The detector consists of a sealed tube filled with gas, $^3$He being the main component. Energetic, charged nuclear particles are generated inside the detector by the neutrons which enter the detector and react with the $^3$He. The nuclear reaction is $$^3\text{He} + n \rightarrow {}^3\text{H} + p + 0.765 \text{ MeV} \tag{1}$$

The energy released by the reaction is shared between the tritium nucleus and the proton. The detector tube also contains a central electrode on which a voltage is applied to maintain a voltage gradient between the central electrode and the tube wall. When such an energetic, charged nuclear particle passes through the gas in the tube, some of the gas molecules are ionized. The ions and electrons are accelerated by the applied electric field, thereby producing a current pulse. The number of current pulses generated per unit time (pulse rate) is thus related to the number of neutrons entering the detector per unit time. The current pulses are counted by the ratemeter. The output of the ratemeter is a signal which is proportional to the pulse rate.

The cross section for reaction (1) is a strong function (approximately $\sim E^{-\frac{1}{2}}$) of the kinetic energy (E) of the neutron. The cross section is less than 1 barn for neutron energies above a few tenths of an MeV. The detector is thus insensitive to neutrons coming directly from the source because the reaction cross section for these energetic neutrons (E > 1 MeV) is so small. This allows the source to be placed next to the detector in a backscatter gauge. On the other hand, $^3$He detectors have very high detection efficiencies for low energy neutrons because the corresponding reaction cross section is very large. The thermal neutron cross section (neutron energy equal to 0.025 eV) is 5330 barns. $^3$He detectors are available which have efficiencies approaching 100 percent for thermal neutrons.

The strong dependence of detector sensitivity on neutron energy makes the backscatter gauges very sensitive to the presence of materials which are good moderators, i.e., those that are efficient in reducing the energies of neutrons to the thermal range where the detectors are efficient. When the backscatter gauge is placed in the immediate vicinity of a good moderator, the number of low energy neutrons reaching the detector increases substantially and the change in the number of current pulses produced per unit time is easily measurable.

Hydrogen is the most effective moderator, so materials which contain substantial amounts of hydrogen are effective moderators. Hydrogen is effective for two reasons:

1. The elastic scattering cross section for hydrogen is relatively large, and

2. In most collisions between a neutron and a hydrogen nucleus, a substantial fraction (on the average one-half) of the energy of the neutron is transferred to the hydrogen nucleus. Roughly 20 collisions with hydrogen are required to reduce the energy of a 1 MeV neutron to the thermal range. A much larger number of collisions is required to achieve this result with all but the very lightest of the other elements.

A neutron backscatter gauge is thus very sensitive to the presence of hydrogen bearing materials but relatively insensitive to the presence of non-hydrogen bearing materials commonly encountered in petrochemical plants. Therefore, a neutron backscatter gauge can be viewed as a "hydrogen detector" in many level measurement applications. In a typical application, a vessel wall made of a non-hydrogen bearing material like steel separates the neutron backscatter gauge from a hydrogen bearing material whose level is to be measured. If the separation is not too great, the presence of the vessel wall does not prevent level measurements from being made. By moving the gauge along the vessel vertically, a water level can be determined through a one inch steel plate in 2 or 3 minutes to an accuracy of approximately an inch, without using calibration procedures.

In most cases, level measurements can be made from the exterior of a vessel. However, if material which contains a substantial amount of hydrogen surrounds the vessel, it may be difficult or impossible to make the desired measurement externally. A vessel with a water or oil jacket, for example, might require that the neutron backscatter gauge be mounted in a well within the vessel.

A neutron backscatter gauge is only sensitive to material located within inches of the source and detector. Therefore, the geometry in which the source and detector are close to or coincident with one another, which results in the detection of low energy "backscattered" neutrons, is generally employed in level measurements applications. However, transmission measurements, in which the source and detector are separated to allow a moderator to be interposed, are useful for some applications. Also, the neutron backscatter gauge can be used to determine the level of any type of interface, not just liquid-gas interfaces such as water-air or oil-air.

Very low intensity neutron sources can be used in most level measurement applications. Since heavy shielding for personnel protection is not required, it is also possible to build a portable backscatter gauge weighing only a few pounds. The principles which apply to measurements made with the portable backscatter gauge are the same as those which apply to fixed level monitors. One such portable gauge consisted of a $^{252}$Cf source, a $^3$He detector (4 atmosphere pressure, 1 inch diameter, 6 inch active length), a 36 inch wand to which the source and detector were attached, and a battery powered combination ratemeter/scaler. The source and detector were mounted on one end of the wand as a means of keeping the source away from the operator when the instrument was in use. For a $^{252}$Cf source with an emission rate of $2.3 \times 10^5$ neutrons/sec (0.1 micrograms of $^{252}$Cf), the combined gamma ray/neutron exposure rate measured at the end of the wand away from the source was less than 0.25 mrem/hr. That is more than a factor of ten below the maximum permissible occupational exposure level of 2.5 mrem/hr for a 40 hour work week. The exposure rate at a distance of 1 foot from the source was approximately 2 mrem/hr. An 8 inch diameter boron impregnated polyethylene bioshield provided personnel protection when the instrument was being transported or stored. The exposure rate measured at the surface of the bioshield was less than 9 mrem/hr for the 0.1 microgram $^{252}$Cf source. It was less than 2 mrem/hr 6 inches from the surface of the bioshield.

Such a portable neutron backscatter gauge can be a valuable tool for measuring levels. It is easy to use and is often the most convenient means of (1) measuring levels in vessels which have no level sensing devices and (2) checking or calibrating level sensors, such as differential pressure cells and gamma ray level gauges, after installation. The gauge has also been used to detect two phase flow in pipes and to determine if pipes were empty before cutting into them.

However, both the fixed level type monitor and the portable type level detector also have significant disadvantages. Perhaps one of the greatest of these is their being limited to detecting essentially a single level, i.e., the presence or absence of a neutron moderator (e.g., hydrogen) at a given location. Of much greater utility in many applications would be a neutron-moderation based fluid level detector which would measure and indicate the fluid level over a wide range, well beyond just those levels immediately adjacent the relatively short detector.

It is easy to see why prior art neutron backscatter level detectors detect the liquid level essentially at only discrete places or over only short intervals, typically where the detector is located or the source is located. At that level, when the fluid/gas interface passes, a sharp transition occurs in the count rate for the moderated neutrons, thereby "detecting" the liquid level. At levels in between, however, no sharp transition, and thus no meaningful indication, is provided. Therefore, if the level is to be detected throughout a range, or at a lot of different levels, it is then customary to employ a correspondingly large number of sources and/or detectors.

A need therefore remains for an improved neutron backscatter fluid level detector which can provide an essentially continuous indication of the fluid level over an extended range without requiring an unreasonably large number of neutron sources and/or detectors. Preferably, such a fluid level detector should be not only uncomplicated in its design and implementation, but also inexpensive, versatile, and capable of providing reliable fluid level detection and indication in the widest possible range of applications.

SUMMARY OF THE INVENTION

Briefly, the present invention meets the above needs and purposes with a new and improved wide-range fluid level detector which is able to detect the fluid level over a range of heights within a vessel, as distinguished from monitoring an event at a single discrete level. The preferred embodiment of the invention includes a plurality of neutron sources each located at its own predetermined height, at least one neutron backscatter detector positioned to detect neutrons which are backscattered from the neutron sources, and means for interpolating the neutron counts from the detector. By interpolating these neutron counts based upon prior calibration movements, a substantially continuous indication of the height of the fluid which is responsible for backscattering the neutrons can be generated. This indication can be provided for liquid levels extending somewhat above and below the limits of the neutron sources as well as for fluid at all levels in between the sources.

In the preferred embodiment, an extended length neutron detector is used, the length of which will depend upon the range of fluid levels being monitored. Near each end of the detector, which is mounted vertically adjacent the vessel, is located a discrete neutron source. The detector is then operated as follows. When the vessel is empty, the neutron detection rate will be at a minimum. When the vessel is full, the number of neutrons moderated by the hydrogen-bearing fluid in the vessel will be at a maximum, and this will be reflected by a maximum rate of detection being recorded by the rate meter attached to the neutron detector. The neutron sources are spaced along the detector such that fluid within the "range" of each source will contribute to moderation of neutrons from that source. The "range" of a source being thus defined, the lowest and highest sources should be positioned such that fluid just below the end of the detector will cause some moderation of neutrons from the lower source, thereby generating a slight response in the detector. Similarly, neutrons just beyond the top of the detector should be moderated to increase the counts provided by the detector. If the detector is short enough, then fluid at the midpoint of the detector, and thus midway between the sources, will cause some of the neutrons form each source to be moderated and detected. If the detector is too long or the sources are too weak to provide a statistically significant effect at any intermediate range along the detector, then additional sources should be located along the detector as appropriate.

As will now be appreciated, rising fluid levels within the container will cause more and more of the neutrons from the source(s) to be moderated, and the count rate of the detector will increase correspondingly. Of course, the effect will be non-linear. In fact, the change in count rate will be most dramatic when the fluid level passes a particular neutron source, and rather unremarkable at levels intermediate or beyond the source(s).

Therefore, the output of the detector/ratemeter is interpolated by an appropriately calibrated interpolation device. In the preferred embodiment, the interpolation is provided by a microcomputer which simply has a look-up table which has been previously prepared during calibration measurements. Thus, a one-to-one correspondence between specific count rates and specific fluid levels is provided by the look-up table regardless of the sometimes severely non-linear response of the source/detector combination. In known fashion, fractional differences between the discrete data in the table can be interpolated according to the needs and preferences of the user.

The embodiment thus far described is not only remarkably straightforward and uncomplicated, but is clearly readily applicable to a wide range of fluid monitoring applications, particularly where measuring within the vessel is awkward or difficult. Where extremely large heights must be monitored, several detectors may be used vertically either in combination with a single interpolator, or sequentially, as desired.

A possible limitation of the embodiment thus far described, however, is the assumption that the neutron moderating characteristics of the fluid are known. Without knowledge of which count rates represent which fluid levels, an accurate reading might be more difficult to obtain. Therefore, the present invention provides several solutions for this problem as well. In one such solution, a second detector is located near the bottom of the vessel, and if necessary a second source is located there as well. Being below the desired measuring/operating range of the vessel, these will be expected to be opposite the neutron moderating fluid at all times. Accordingly, a direct indication of the combined effects of the fluid-filled environment (moderating ability of the fluid, neutron absorption by the fluid, effects of the vessel wall, etc.) can be obtained, and appropriate ratios or scalers can be applied to the interpolator.

Another and more sophisticated means for calibrating is to use self-calibration based upon matching the "response shapes". The term "shape" is defined herein to be the mathematical analog of a graphical curve. However, in today's technology it is not necessary to talk about actually matching the physical shapes of a curve because modern computational techniques do not need to describe a physical curve in order to correlate the data. Thus, as taught herein, regardless of the moderation cross-section of the fluid, the shape of the response as a function of the fluid level will be the same over the range of the detector. Once this shape is determined for the detector (using known changes in fluid level), therefore, it is a straightforward matter to make the detector self-calibrating. When measuring an unknown fluid, or when located adjacent an unknown vessel (the thickness of the vessel wall having at least a nominal effect, for example), the initial reading would not indicate the fluid level. However, as soon as the level changed enough to cause the curve to pass through two inflection points, "curve" being used figuratively here as discussed above, the shape of the response could then be matched to the predetermined shape which was known to represent the response of the detector over a correlated range. The invention can thus be self-calibrating. In fact, this capacity for self-calibration can be advantageously employed to monitor and to provide a self-check for the fluid level detector even in known applications.

It is therefore an object of the present invention to provide an improved method and apparatus for detecting fluid levels over a wide range; such a method and apparatus which detect such fluid levels using neutron backscatter techniques; which use one or more neutron sources each located at its own predetermined height; which include at least one neutron backscatter detector positioned to detect neutrons backscattered from the neutron sources; which interpolate the neutron counts from the detector to provide an indication, when adjacent a fluid which backscatters neutrons from the sources, of the height of the fluid responsible for such backscattering, to furnish an indication of the fluid level at least through the range of levels between the neutron sources; in which the interpolation may be done by correlating the neutron counts from the detector with previously derived calibration data for the level detector; in which the previously derived calibration data may be a look-up table; which may include at least one additional neutron detector, located at a position below the lowest level that such a fluid is expected to reach, to monitor the effect of the fluid on the count rate; which can compensate for the influence of the fluid upon the count rates of the detectors by responding to the count rates of the additional neutron detector below the lowest fluid level; which can be self-calibrating as a function of the shape of the response of the fluid level detector; and to accomplish the above objects and purposes in an inexpensive, uncomplicated, durable, versatile, and reliable method and apparatus, inexpensive to manufacture and implement, and readily suited to the widest possible utilization in fluid level measurement applications.

These and other objects and advantages of the invention will be apparent from the following description, the accompanying drawings, and the appended claims.

BRIEF DESCRIPTION OF THE DRAWING

The drawing FIGURE provides a schematic illustration of a wide-range fluid level detector according to the present invention.

DESCRIPTION OF THE PREFERRED EMBODIMENTS

With reference to the drawings, the new and improved wide-range fluid level detector, and the method therefor according to the present invention will be described. As shown in the drawing, the wide-range level transmitter or detector system 10, based on the neutron backscatter technique, consists of one or more neutron detectors 20, a distributed source of neutrons 25 and 26, a ratemeter 30, and an interpolator 40. The neutron detector 20 is a model P4-0836-209 $^3$He detector available from Reuter Stokes, Cleveland, Ohio. The neutron sources 25 and 26 are each 100 millicurie $^{241}$Am/Be sources. The ratemeter 30 is a model 177 ratemeter from Ludlum Measurements, Inc., Sweetwater, Texas. The interpolator 40, in the preferred embodiment, is a microcomputer for ease in programming and development, but other appropriate and less expensive means for interpolation may be employed according to the needs at hand.

In known fashion, the ratemeter 30 converts the current pulses produced by the neutron detector 20, when the neutrons are detected, to a DC signal which is proportional to the neutron detection rate. The rate at which the neutrons are moderated will be a function of the level of the neutron moderating fluid near the level detector system 10. The fluid level is not a linear function of the neutron detection rate, however. The interpolator 40 is thus employed to generate a DC signal which is a linear function of the fluid level, the interpolation being based upon the ratemeter 30 output and calibration data previously measured (e.g., a look-up table).

To illustrate the use of the level detector system 10, was well as to prove its feasibility, it was incorporated into a simple system for monitoring and controlling the water level in a tank 50. The water 52 in the tank was continuously being withdrawn by an exhaust pump 53. Replacement water for the tank 50, under the control of the level detector system 10, was supplied through a proportional-integral-derivative controller 56 operating an electro-pneumatic transducer 57 which in turn opened and closed a water inlet valve 60. Good level control was achieved with this system.

The results of this test show that two neutron sources 25 and 26 are adequate for a 36 inch long detector. The fluid level can in fact be measured to an accuracy of one-fourth inch or better if calibration measurements are made at 2- or 3-inch intervals over the length of the detector. Even when the relationship between detection rate and fluid level was merely approximated by a linear function, the accuracy was not degraded to more than about 3 inches, which is adequate for many plant applications.

As can be seen therefore, the present invention has numerous advantages. It can be built at a cost which is competitive with that of conventional level control systems, but has several distinct advantages over other such types of level monitoring devices. These include the absence of mechanical linkages, floats, or other moving parts. Also, the invention is non-intrusive, such that the sources and detector(s) may be located on the outside of the vessel walls.

Although the preferred embodiment has been described in terms of discrete neutron sources, it will be appreciated that one or more continuously distributed sources, such as a wire coated with a neutron emitter, can be used as well. Such a continuously distributed source would equally provide the plurality of sources, each at its own height, called for by the teachings herein.

In more sophisticated applications, two detectors may be used to eliminate the effects of changes in the fluid (such as fluid density) on the computed fluid level. That is, a second detector can be placed below the lowest level that the fluid is expected to reach. The second detector will thus be able to monitor the effect of the fluid on the count rate, such that the ratio of the detection rates of the detectors will be a function of fluid level only and not influenced by changes in the fluid.

Alternatively, the invention can take advantage of the non-linear relationship between the neutron detection rate and the fluid level to allow the level detector system to be self-calibrating. That is, the detector can automatically compensate for changes in fluid density by monitoring the shape of the response over a correlated range. Changes in density would change the absolute count rates, but would not change the response shape as a function of fluid level. Accordingly, by monitoring the shape of the response, adjustments to compensate for changes in fluid density can readily be provided.

The invention thus provides an inexpensive, highly versatile, uncomplicated, reliable and effective method and apparatus for wide-range fluid level detection which is readily suited for application wherever it is desired to monitor the level of neutron-moderating fluids.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A wide-range fluid level detector, comprising:
   (a) a plurality of neutron sources each located at its own predetermined height;
   (b) at least one neutron backscatter detector positioned to detect neutrons backscattered from said neutron sources;
   (c) at least one additional neutron source and detector located at a position below the lowest level that such a fluid is expected to reach, to monitor the effect of the fluid on the count rate; and
   (d) means for interpolating the neutron counts from each said detector to provide an indication, when said level detector is adjacent a fluid which backscatters the neutrons from said sources to said detector, of the height of the fluid responsible for such backscattering, said means for interpolating thereby furnishing an indication of the fluid level at least through the range of levels between said neutron sources.

2. The apparatus of claim 1 further comprising compensating means for said neutron detectors for responding to the count rates of said additional neutron detector which is below the lowest fluid level to compensate for the influence of the fluid upon the count rates of said detectors.

3. The apparatus of claim 1 further comprising means for self-calibrating said fluid level detector as a function of the shape of the response thereof.

4. A wide-range fluid level detector, comprising:
   (a) a plurality of neutron sources each located at its own predetermined height;

(b) a plurality of neutron backscatter detectors positioned to detect neutrons backscattered from said neutron sources;

(c) means for interpolating the neutron counts from said detectors to provide a substantially continuous indication, when said level detector is adjacent a fluid which backscatters the neutrons from said sources to said detectors, of the height of the fluid responsible for such backscattering, said means for interpolating including means for correlating the neutron counts from each said detector with a look-up table of previously derived calibration data for said level detector, said means for interpolating thereby furnishing an indication of the fluid level at least through the range of levels between said neutron sources;

(d) at least one additional neutron source and detector located at a position below the lowest level that such a fluid is expected to reach, to monitor the effect of the fluid on the count rate;

(e) ratio means for said neutron detectors for responding to the count rates of said additional neutron detector which is below the lowest fluid level to compensate for the infuence of the fluid upon the count rates of said detectors; and (f) means for self-calibrating said fluid level detector as a function of the shape of the response thereof.

5. A wide-range fluid level detection method, comprising:
(a) detecting neutrons backscattered by a fluid from a plurality of neutron sources each located at its own predetermined height;
(b) monitoring the effect of the fluid on the count rate by detecting backscattered neutrons at an additional position below the lowest level that the fluid is expected to reach; and
(c) interpolating the detected neutron counts to provide an indication of the height of the fluid responsible for such backscattering, said interpolating thereby furnishing an indication of the fluid level at least through the range of levels between the neutron sources.

6. The method of claim 5 further comprising compensating for the influence of the fluid upon the count rates of the detectors as a predetermined function of the count rates of the additional neutron detector which is located below the lowest expected fluid level.

7. A wide-range fluid level detection method, comprising:
(a) detecting neutrons backscattered by a fluid from a plurality of neutron sources each located at its own predetermined height;
(b) interpolating the detected neutron counts by correlating the neutron counts from the detector which previously derived calibration data from a look-up table, to provide an indication of the height of the fluid responsible for such backscattering, said interpolating thereby furnishing an indication of the fluid level at least through the range of levels between the neutron sources;
(c) monitoring the effect of the fluid on the count rate by detecting backscattered neutrons at an additional position below the lowest level that the fluid is expected to reach;
(d) compensating for the influence of the fluid upon the count rates of the detectors as a predetermined function of the count rates of the additional neutron detector which is located below the lowest expected fluid level; and
(e) self-calibrating the fluid level detector as a function of the shape of the response thereof.

8. A wide-range fluid level detection method, comprising:
(a) detecting neutrons backscattered by a fluid from a plurality of neutron sources each located at its own predetermined height; and
(b) interpolating the detected neutron counts to provide an indication of the height of the fluid responsible for such backscattering, said interpolating including self-calibrating the fluid level detector as a function of the shape of the response of the detected neutrons, said interpolating thereby furnishing an indication of the fluid level at least through the range of levels between the neutron sources.

* * * * *